(12) United States Patent
Chakrabarty et al.

(10) Patent No.: US 11,967,053 B2
(45) Date of Patent: *Apr. 23, 2024

(54) EVENLY SPACED CURVE SAMPLING TECHNIQUE FOR DIGITAL VISUAL CONTENT TRANSFORMATION

(71) Applicant: Adobe Inc., San Jose, CA (US)

(72) Inventors: Saikat Chakrabarty, Noida (IN); Shikhar Garg, New Delhi (IN)

(73) Assignee: Adobe Inc., San Jose, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 17/411,771

(22) Filed: Aug. 25, 2021

(65) Prior Publication Data

US 2021/0383515 A1  Dec. 9, 2021

Related U.S. Application Data

(63) Continuation of application No. 16/666,179, filed on Oct. 28, 2019, now Pat. No. 11,127,124.

(51) Int. Cl.
*G06T 5/00* (2006.01)
*G06T 5/92* (2024.01)
*G06T 11/20* (2006.01)

(52) U.S. Cl.
CPC .............. *G06T 5/92* (2024.01); *G06T 11/203* (2013.01); *G06T 11/206* (2013.01); *G06T 2207/20072* (2013.01); *G06T 2207/20208* (2013.01)

(58) Field of Classification Search
CPC ......... G06T 2207/20072; G06T 11/203; G06T 11/206; G06T 5/009; G06T 2207/20208
See application file for complete search history.

(56) References Cited

U.S. PATENT DOCUMENTS

| | | |
|---|---|---|
| 2007/0041661 A1 | 2/2007 | Hung et al. |
| 2008/0062177 A1 | 3/2008 | Gaul et al. |
| 2014/0092012 A1 | 4/2014 | Seshadrinathan et al. |
| 2018/0286093 A1 | 10/2018 | Daems et al. |
| 2019/0052908 A1 | 2/2019 | Mertens et al. |
| 2019/0238816 A1 | 8/2019 | Sun et al. |
| 2020/0005441 A1 | 1/2020 | Pytlarz et al. |

(Continued)

OTHER PUBLICATIONS

"Notice of Allowance", U.S. Appl. No. 16/666,179, dated May 13, 2021, 9 pages.

(Continued)

*Primary Examiner* — Phuc N Doan
(74) *Attorney, Agent, or Firm* — FIG. 1 Patents

(57) ABSTRACT

A curve sampling technique for generating transformed digital visual content is leveraged in a digital medium environment. Initially, a curve sampling system obtains digital visual content, e.g., images and videos. The curve sampling system generates transformed digital visual content by transforming one or more pixels of the digital visual content using a lookup table that is derived from samples of a curve taken at evenly spaced intervals along a y-axis of a graph of the curve. Broadly speaking, the curve defines how to transform a visual characteristic of the pixels in order to achieve a desired digital visual content transformation. Additionally, the curve sampling may correspond to one step in a series of steps for transforming colors of digital visual content. Indeed, such transformations may involve multiple curve sampling steps.

20 Claims, 9 Drawing Sheets

(56) References Cited

U.S. PATENT DOCUMENTS

2020/0334880 A1  10/2020  Baran et al.
2021/0034644 A1   2/2021  Li et al.

OTHER PUBLICATIONS

Chinnock, Chris, "Should HDR Displays Follow the PQ Curve?", Insight Media Blog [online][retrieved Apr. 11, 2021]. Retrieved from the Internet <https://www.insightmedia.info/should-hdr-displays-follow-the-pq-curve/#:~:text=Many%20in%20the%20group%20believed,curve%20as%20well%20as%20possible.>., May 13, 2018, 10 pages.

Eilertsen, G. et al., "A comparative review of tone-mapping algorithms for high dynamic range video", Computer Graphics Forum, vol. 36, No. 2, State of the Art Reports [retrieved May 13, 2021]. Retrieved from the Internet <https://doi.org/10.1111/cgf.13148>., May 23, 2017, 27 pages.

EVENLY SPACED CURVE SAMPLING TECHNIQUE FOR DIGITAL VISUAL CONTENT TRANSFORMATION

BACKGROUND

Conventional systems employ a variety of techniques to transform and display digital visual content on display devices having varying display characteristics. Such transformation can include altering pixel characteristics of the digital visual content, e.g., color, luminosity, clarity, brightness, shadows, and so forth. Conventional systems transform pixels of the digital visual content by interpolating curves that define how to change these characteristics. For example, conventional systems transform colors of these pixels using a series of mathematical operations, such as interpolation of one dimensional (1D) curves. Such 1D interpolation operations are commonly used in connection with gamma correction, for instance. Conventional systems interpolate curves by implementing techniques such as linear, polynomial, and spline interpolation. Rather than using these interpolation techniques, some conventional systems use an uneven curve sampling technique to transform pixels, while others utilize segmented lookup tables to transform pixels in connection with certain types of digital visual content, e.g., high-dynamic range (HDR) digital visual content. However, deficiencies of these approaches may fail to transform digital visual content in a consistent manner across different devices such that different portions (e.g., video frames) of digital visual content maintain a consistent appearance.

SUMMARY

To overcome these problems, a curve sampling technique for generating transformed digital visual content is leveraged in a digital medium environment. Initially, a curve sampling system obtains digital visual content, such as images or videos, which comprises a plurality of pixels. The curve sampling system generates transformed digital visual content by transforming one or more of the pixels of the digital visual content using a lookup table. This lookup table is derived, in part, from samples of a curve that are taken at evenly spaced intervals along a y-axis of a graph of the curve. Broadly speaking, the curve defines how to transform a visual characteristic of the pixels in order to achieve a desired digital visual content transformation. One example of such transformation is from standard dynamic range (SDR) digital visual content to high dynamic range (HDR) digital visual content. The curve sampling system then displays the transformed digital visual content on a computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
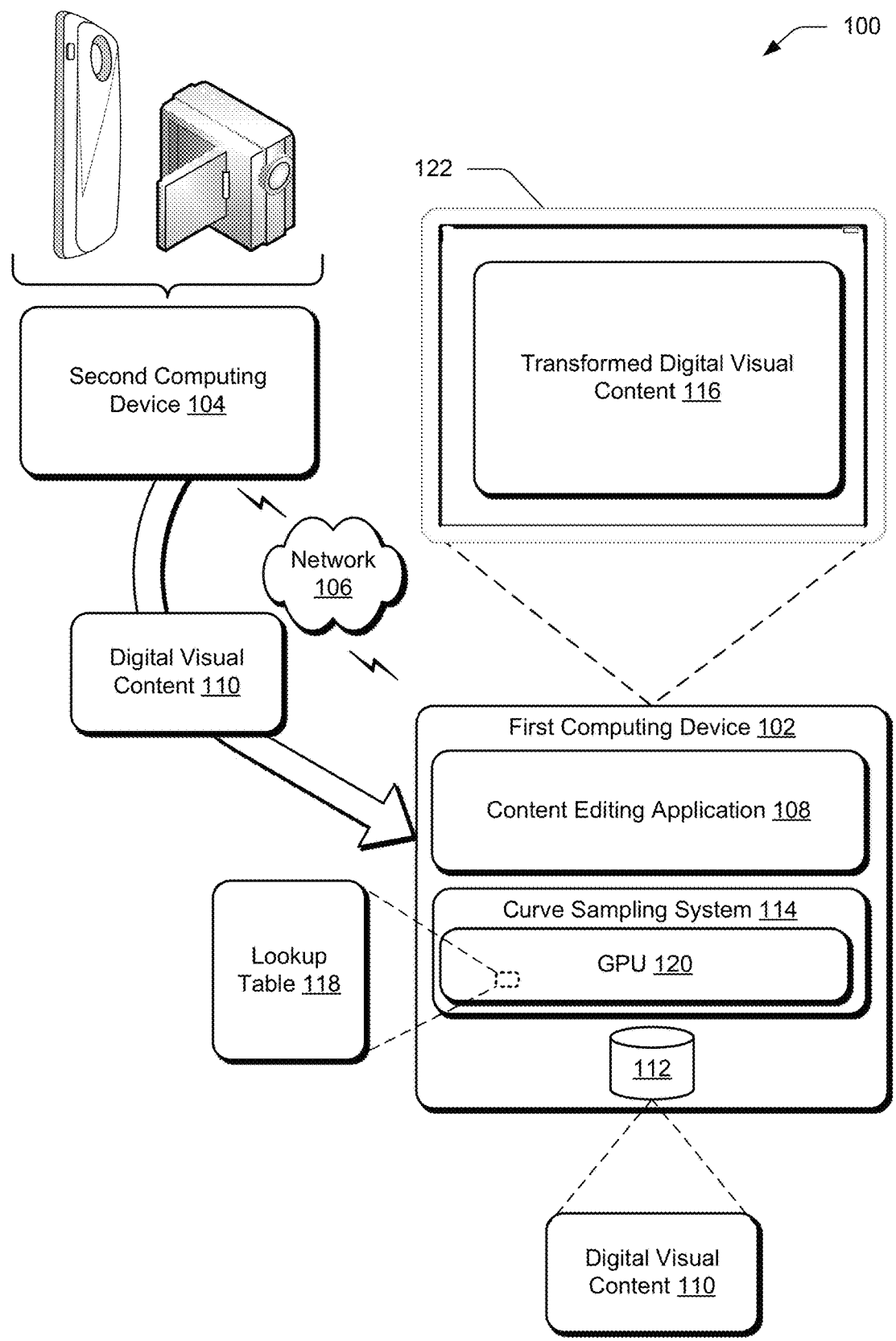
FIG. 1 is an illustration of an environment that is operable to employ the techniques described herein.

Conventional systems employ a variety of techniques to transform and display digital visual content. These systems transform pixel characteristics of the digital visual content by interpolating curves that define these pixel characteristics. By way of example, conventional systems interpolate the curves using linear, polynomial, and spline interpolation techniques. Other conventional systems transform digital visual content using uneven curve sampling techniques and segmented lookup tables. These techniques, however, suffer from various deficiencies. The uneven curve sampling technique fails to ensure that interpolation errors between samples associated with a particular curve are maintained below a threshold, and results in inefficient memory use because this technique loads several textures (e.g., three) into a graphics processing unit (GPU). Additionally, the failure of the uneven curve sampling technique to ensure that the interpolation error is maintained below a threshold renders the technique unsuitable for transforming pixels of certain types of digital visual content, e.g., high dynamic range (HDR) digital visual content. Conventional systems that use segmented lookup tables also suffer from deficiencies. First, use of segmented lookup tables results in inefficient memory use. Second, segmented lookup tables do not handle transformations that are based on curves having a concave upward shape. This is because segmented lookup tables do not include enough samples for concaving upwards portions, where there is a relatively drastic change, to accurately capture the visual-characteristic transformation defined by this portion. This issue of failing to include enough samples at portions of curves having a relatively drastic slope change is also a problem with techniques that involve taking samples at evenly spaced intervals in relation to the x-axis.

To overcome these problems, a curve sampling technique for generating transformed digital visual content is leveraged in a digital medium environment. Initially, a curve sampling system may obtain digital visual content, e.g., images or videos. By way of example, the curve sampling system may obtain images or videos, in the form of standard dynamic range (SDR) digital visual content or HDR digital visual content. Generally speaking, the digital visual content includes a plurality of pixels, which are associated with at least one visual characteristic, e.g., color, tone, or luminosity.

In accordance with the described techniques, the curve sampling system may generate transformed digital visual content by transforming at least one visual characteristic of the digital visual content's pixels using a lookup table. By way of example, the curve system may perform curve sampling as one step in a series of steps for transforming colors of the digital visual content. In one or more implementations, such transformations may involve multiple curve sampling steps. If the digital visual content is SDR digital visual content, for instance, then the curve sampling system may use a suitably generated lookup table to transform visual characteristics of pixels of the SDR digital visual content to generate an HDR version of the digital visual content.

The lookup table utilized by the curve sampling system for such a transformation may be derived from samples of a curve taken at evenly spaced intervals along a y-axis of a graph of the curve. Indeed, this contrasts with some conventional techniques that take samples at evenly spaced intervals along an x-axis of the graph. Regardless, as part of generating the lookup table, the curve sampling system can generate a y-axis table that includes y-values corresponding to the evenly spaced intervals along the y-axis of the graph of the curve. By taking samples at evenly spaced intervals along the y-axis of the graph of a curve, the curve sampling system includes enough samples at portions of the curve having a relatively drastic slope change, which enables the system to accurately capture the visual-characteristic transformation defined by these portions. In this way, sampling the y-axis of the graph of the curve at evenly spaced intervals enables the curve sampling system to accurately transform digital visual content with pixels that have visual characteristics that are defined by curves having a relatively drastic slope change.

The range of the y-values in the y-axis table and a number of samples to be taken may define a size of the y-axis table. In one or more implementations, a number of samples may be based on an amount of computing resources available to an application leveraging the evenly spaced curve sampling technique. If the application has access to a greater amount of computing resource (e.g., processing cycles, memory, and so forth), then a greater number of samples may be taken relative to scenarios where the application has access to fewer resources. By way of example, an application employing the evenly spaced curve sampling technique on a desktop may have access to more resources than an application employing the evenly spaced curve sampling technique on a mobile device. Accordingly, the curve sampling system may generate more samples in connection with generating a lookup table for use by the desktop-based application than for use by the mobile-based application. In any case, more samples for a same range may cause the y-value interval between the samples to be smaller than with fewer samples. In operation, a size of the y-axis table may be calculated by dividing a range of the y-values by an interval value of the evenly spaced interval (i.e. range value/interval value).

To generate the lookup table, the curve sampling system may generate an x-values table having x-values that are correspondences on the curve, defining the transformation, to y-values in the y-axis table. Thus, every value in the x-values table may correspond to a respective y-value in the y-axis table. In one or more implementations, the curve sampling system may also generate an x-reference dataset with x-reference values at evenly spaced intervals along the x-axis of the graph of the curve. For example, the x-reference dataset may include x-reference values that are identical to the y-values in the y-axis table in scenarios where the ranges of the x-values and y-values are the same.

Using the y-axis table, x-values table, and x-reference data set, the curve sampling system may generate a lookup table that includes two portions—an x-index portion and a slope parameter portion. The curve sampling system may then generate an x-index portion including a plurality of x-index values, each of which may be encoded in a 12-bit format. Each x-index value in the x-index portion may correspond to a respective x-value in the x-values table, and may be usable to identify a specific table entry in the x-values table where the corresponding x-value is located. The corresponding x-value may be the largest x-value in the x-values table that is less than or equal to a respective x-reference value to which the x-index value may correspond. To this end, it is also noted that each x-index value in the x-index portion may correspond to a respective x-reference value in the x-reference dataset. As such, a number of x-index values in the x-index portion may be the same as a number of x-reference values in the x-reference dataset.

The slope parameter portion may include a plurality of slope values, each of which may be encoded in a 4-bit format. Broadly speaking, a slope value may define a slope between consecutive x-index values in the x-index portion, and may correspond to a respective x-index value in the x-index portion. As such, a number of slope values in the slope parameter portion may be equal to the number of x-index values, which in turn, may be equal to the number of values included in the x-axis table and the y-axis table.

Given this, the curve sampling system may generate a lookup table by combining the x-index portion (e.g., with x-index values) and the slope parameter portion (e.g., with slope values). In connection with transforming the digital visual content, the curve sampling system may load the lookup table into a GPU as a single texture. After generating the transformed digital visual content, the curve sampling system may display the transformed digital visual content on a display of the computing device. For example, the curve sampling system may transform SDR digital visual content into HDR digital visual content and may display the HDR digital visual content on the display of a computing device.

The manner in which the curve sampling system transforms digital visual content, namely, using the lookup table derived from samples of a curve taken at evenly spaced intervals along a y-axis of the curve, contrasts with conventional systems used for transforming content. Use of this lookup table by the curve sampling system addresses and overcomes the above-noted deficiencies of conventional techniques. By transforming the digital visual content using a lookup table derived from samples taken at evenly spaced intervals along a y-axis, the curve sampling system ensures that interpolation errors between samples associated with a curve (which defines how to transform at least one visual characteristic of pixels) are maintained below a threshold, and that the transformation occurs in a memory efficient manner. Moreover, the generation and use of the lookup table as described above and below enables the curve sampling system to transform various type of digital visual content, including HDR digital visual content. The curve sampling system transforms HDR digital visual content, in part, by including enough samples at portions of a curve having a relatively drastic slope change, which enables the system to accurately capture the visual-characteristic transformation defined by these portions.

Example Environment

FIG. 1 is an illustration of a digital medium environment 100 in an example implementation that is operable to employ the techniques described herein. The illustrated environment 100 includes a first computing device 102 and a second computing device 104 that are communicatively coupled, one to another, via a network 106.

These computing devices may be configured in a variety of ways. The first computing device 102 and the second computing device 104, for instance, may be configured as a desktop computer, a laptop computer, a mobile device (e.g., assuming a handheld configuration such as a tablet or a mobile phone), a camera, and so forth. Thus, the first computing 102 and the second computing device 104 may range from full resources devices with substantial memory and processor resources (e.g., personal computers, game consoles) to a low-resource device with limited memory and/or processing resources (e.g., mobile devices). Additionally, a device may be representative of a plurality of different devices, such as multiple servers utilized by a business to perform operations "over the cloud" as described in FIG. 9.

In the illustrated environment 100, the first computing device 102 is depicted including a content editing application 108. The content editing application 108 includes functionality to edit digital visual content, such as digital graphics, digital videos, digital images, and digital images that include graphics. Examples of digital graphics include, but are not limited to, vector graphics, raster graphics (e.g., digital photographs), layouts having different types of graphics, and so forth.

Further, the content editing application 108 may enable a user to interact with application interfaces presented via the first computing device 102 to perform content editing operations, such as editing aspects of High dynamic range (HDR) digital visual content. Such editing can include altering visual characteristics of the HDR digital visual content (e.g., color, luminosity, clarity, brightness, shadows, and so on). The content editing application 108 may also facilitate other content editing operations. The content editing application 108 may further be representative of more than one application (e.g., a suite of applications) that supports functionality to perform content editing operations on various types of digital content without departing from the spirit or scope of the techniques described herein.

At least some of the digital content, relative to which the content editing application 108 is configured to perform operations, is represented by digital visual content 110, which is illustrated as maintained in storage 112 of the first computing device 102. Although the digital visual content 110 is illustrated as being maintained in the storage 112, the digital visual content 110 may also represent digital visual content accessible to the computing device 102 in other ways, e.g., accessible to the computing device 102 from storage of another device over network 106. In such implementations, the computing device 102 may represent functionality to generate transformed digital visual content 116 by implementing the evenly spaced curve sampling technique described above and below for other devices, e.g., to offload some of the computing burden of doing so from those devices.

In this context, the first computing device 102 is depicted as including curve sampling system 114, the functionality of which may be incorporated in and/or accessible to the content editing application 108. The curve sampling system 114 is implemented at least partially in hardware of the computing device 102 to generate transformed digital visual content 116 by transforming one or more pixels of the digital visual content 110. In particular, the curve sampling system 114 generates transformed digital visual content 116 by transforming one or more pixels of digital visual content 110 using a lookup table 118. As discussed in more detail below, the lookup table 118 is derived, in part, from samples of a curve taken at evenly spaced intervals along a y-axis of a graph of the curve, where the curve defines how to transform a visual characteristic of pixels in order to achieve a desired digital visual content transformation, e.g., from standard dynamic range (SDR) digital visual content to high dynamic range (HDR) digital visual content. As also discussed in more detail below, the curve sampling system 114 can use the lookup table 118 for the evenly spaced curve sampling by loading it into GPU 120 as a single texture, which contrasts with conventional techniques that use multiple textures in memory.

Consider an example in which the first computing device 102 receives the digital visual content 110 from the second computing device 104. In this example, the second computing device 104 may be particularly suited for capturing scenes and converting them with image sensors into the digital visual content 110. For instance, the second computing device may be configured as a digital camera, a digital video camera, or a device incorporating such functionality. In this example, the first computing device 102 may be particularly suited for editing the digital visual content 110, e.g., using the content editing application 108. Thus, in this scenario, a user may select to transfer the digital visual content from the second computing device 104 suited for capturing to the first computing device 102 suited for editing. Also in this example, the digital visual content 110 may be captured by the second computing device 104 and received by the first computing device 102 as SDR digital visual content. Here, the curve sampling system 114 may use the curve sampling technique described herein to convert the digital visual content 110 comprising SDR content into HDR content, which corresponds to the transformed digital visual content 116. It is to be appreciated that this is simply one implementation scenario in which the techniques discussed herein may be deployed and, indeed, the discussed techniques may be deployed in a variety of other scenarios without departing from the spirit or scope. For instance, the first computing device 102 may include camera functionality and leverage the curve sampling system 114 to transform digital visual content captured by that camera according to the described techniques. The transformed digital visual content 116 may also be displayed, such as via display device 122 of the computing device 102, and/or maintained in the storage 112.

In contrast to the evenly spaced curve sampling technique discussed herein, conventional systems may use uneven curve sampling to transform digital visual content. However, these conventional systems use memory inefficiently because techniques based on uneven curve sampling involve loading several textures into a GPU—rather than loading the lookup table 118 as a single texture into the GPU 120. In addition, these conventional systems are unsuitable for transforming pixels of HDR digital visual content because use of uneven sampling fails to ensure that interpolation errors, between samples taken of a particular curve, are maintained below a threshold.

By generating transformed digital visual content using the curve sampling technique described herein, the curve sampling system 114 addresses these deficiencies. At least in part through generating the lookup table 118 from samples taken at equal intervals along a y-axis of a curve, the curve sampling system 114 is able to use memory efficiently, and maintain interpolation errors below a threshold in connection with samples taken from a particular curve.

Having considered an example environment, consider now a discussion of some example details of the evenly spaced curve sampling technique for transformed digital visual content generation in a digital medium environment in accordance with one or more implementations.

Figure 2:
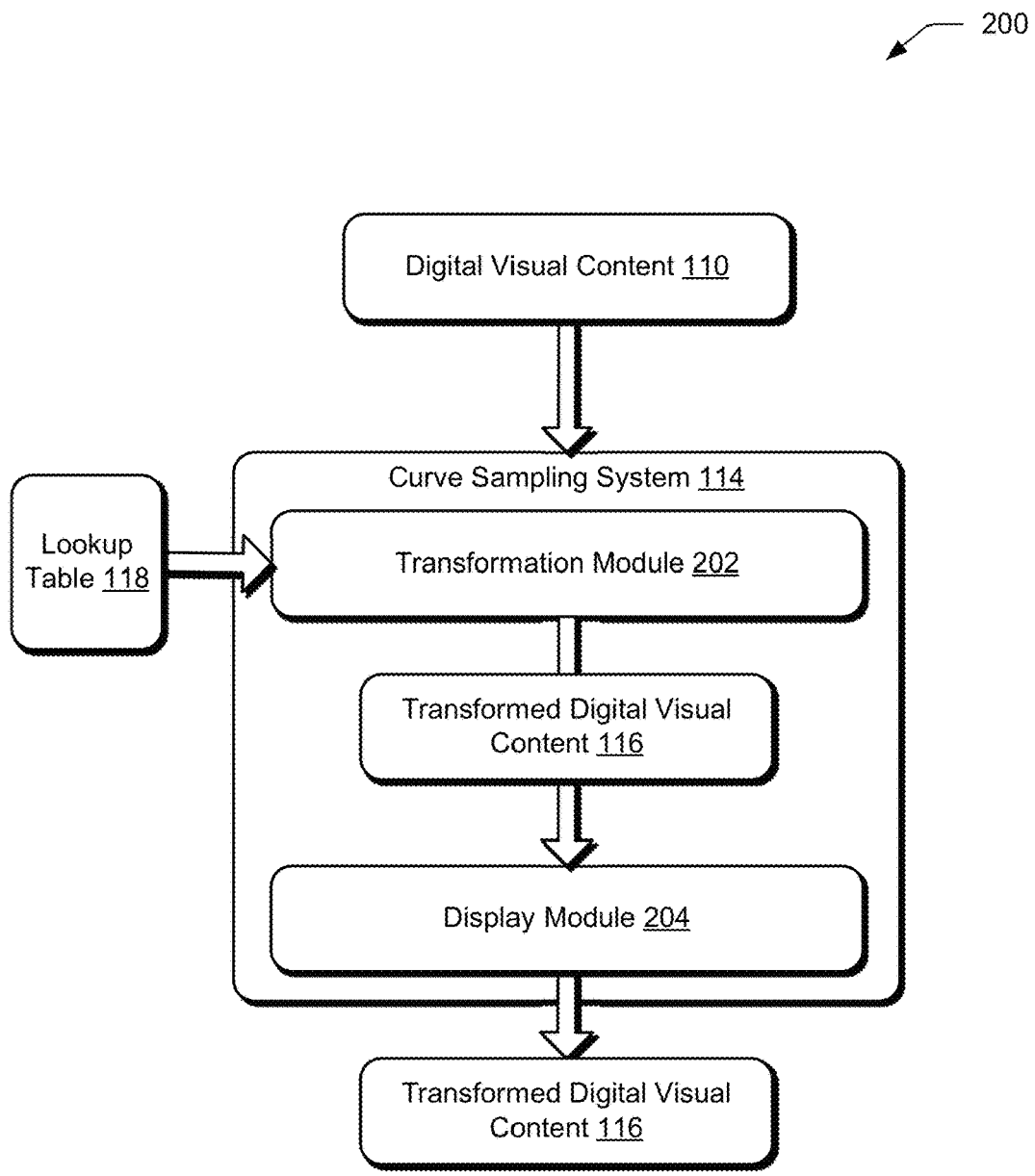
FIG. 2 depicts an example system in which a curve sampling system of FIG. 1 transforms digital visual content and displays the transformed digital visual content.

Evenly Spaced Curve Sampling Technique for Digital Visual Content Transformation FIG. 2 depicts an example system 200 in which a curve sampling system of FIG. 1 transforms digital visual content and displays the transformed digital visual content. From FIG. 1, the illustrated example 200 includes the curve sampling system 114.

The curve sampling system 114 is depicted obtaining the digital visual content 110 and the lookup table 118 as input and outputting (e.g. for display) the transformed digital visual content 116. In the illustrated example 200, the curve sampling system 114 includes transformation module 202 and display module 204. Although depicted with these two modules, in implementation, the curve sampling system 114 may also include more, fewer, or different modules to generate transformed digital visual content without departing from the spirit and scope of the techniques described herein.

After the digital visual content 110 is obtained by curve sampling system 114, the transformation module 202 uses the lookup table 118 to generate the transformed digital visual content 116 from the digital visual content 110. By way of example, if the digital visual content 110 received by the curve sampling system 114 is SDR digital visual content, the transformation module 202 may generate the transformed digital visual content 116 in the form of HDR digital visual content. Alternatively, if the digital visual content 110 is HDR digital visual content, the transformation module 202 may generate the transformed digital visual content 116 in the form of HDR digital visual content but with some change to one or more visual characteristics. Regardless, the transformed digital visual content 116 includes changes to at least one visual characteristic of the digital visual content 110, and these changes are defined by a curve represented by the lookup table 118.

Thereafter, the display module 204 outputs the transformed digital visual content 116. By way of example, the display module 204 may cause display of the transformed digital visual content 116 on the display 122 of the computing device 102. In the context of generating the lookup table 118 from a curve defining desired visual characteristic changes, consider the following discussion of FIGS. 3-6.

Figure 3:
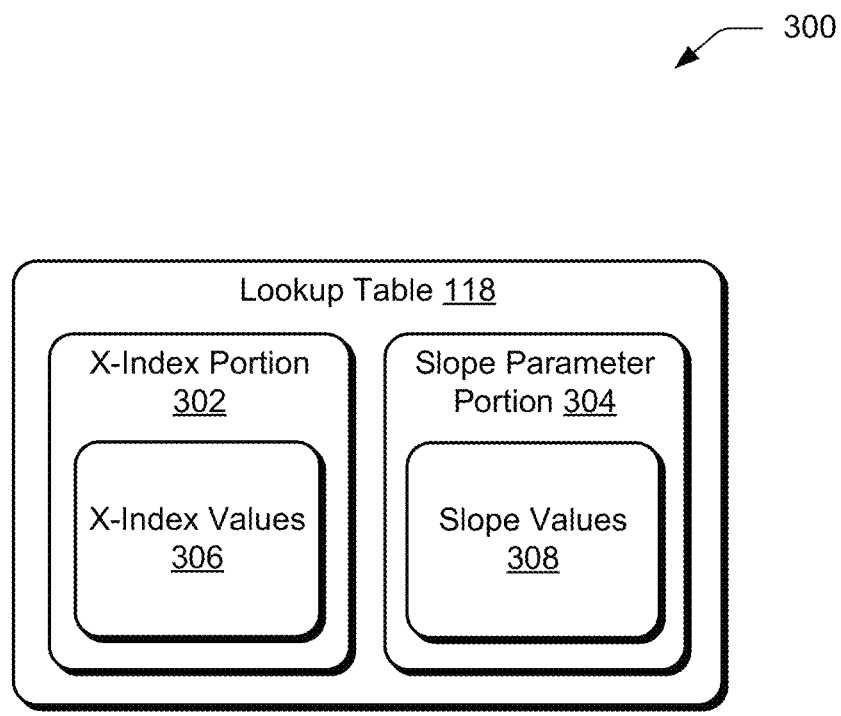
FIG. 3 depicts an example implementation of a lookup table used with an evenly spaced curve sampling technique.

FIG. 3 depicts an example 300 of implementation of a lookup table used with an evenly spaced curve sampling technique. In the illustrated example 300, the lookup table 118 includes two separate and distinct portions—x-index portion 302 and slope parameter portion 304. The x-index portion 302 includes x-index values 306 and the slope parameter portion 304 includes slope values 308. In the context of FIG. 2, the transformation module 202 uses, in part, the x-index values 306 and the slope values 308 to generate the transformed digital visual content 116. In particular, generation of the transformed digital visual content 116 includes loading the lookup table 118—having the x-index values 306 and the slope values 308—as a single texture in the GPU 120. After the lookup table 118 is generated, the x-index portion 302 and the slope parameter portion 304 may be maintained in storage 112 of the first computing device 102 by the curve sampling system 114. Moreover, these stored portions are used in the future to transform digital visual content 110 into transformed digital visual content 116 having a desired visual effect. The manner in which the above-noted portions of the lookup table 118 are generated is described in the discussion of FIGS. 4-6.

Figure 4:
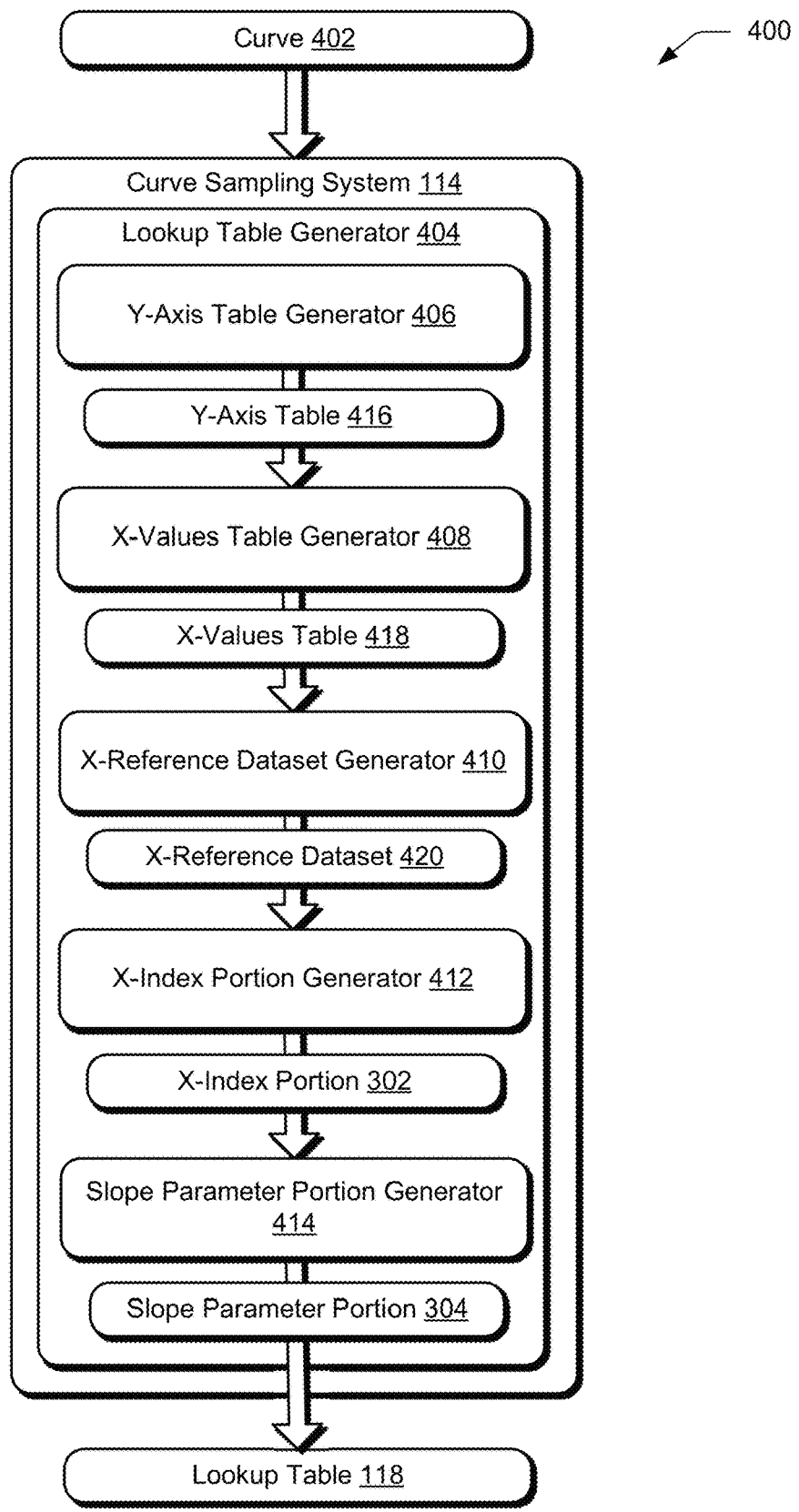
FIG. 4 depicts an example system in which a lookup table is generated from a curve and for use with an evenly spaced curve sampling technique.

FIG. 4 depicts an example system 400 in which a lookup table is generated from a curve and for use with an evenly spaced curve sampling technique.

The illustrated example 400 includes the curve sampling system 114 with a curve 402 and lookup table generator 404. The lookup table generator 404 includes y-axis table generator 406, x-values table generator 408, x-reference dataset generator 410, x-index portion generator 412, and slope parameter portion generator 414. These generators represent functionality to generate a lookup table that is maintained for use with the evenly spaced curve sampling technique for transforming digital visual content 110. Although depicted with these generators, in implementation, lookup table generator 404 may include more, fewer, or different generators that are usable to generate a lookup table without departing from the spirit and scope of the techniques described herein.

In the illustrated example 400, the curve sampling system 114 is depicted as receiving the curve 402. The curve sampling system 114 may receive the curve 402, for instance, in association with or after transferring the digital visual content 110 from the second computing device 104 to the first computing device 102. In the context of curves that define how one or more visual characteristics are changed, consider the following example curve discussed in relation to FIG. 5.

Figure 5:
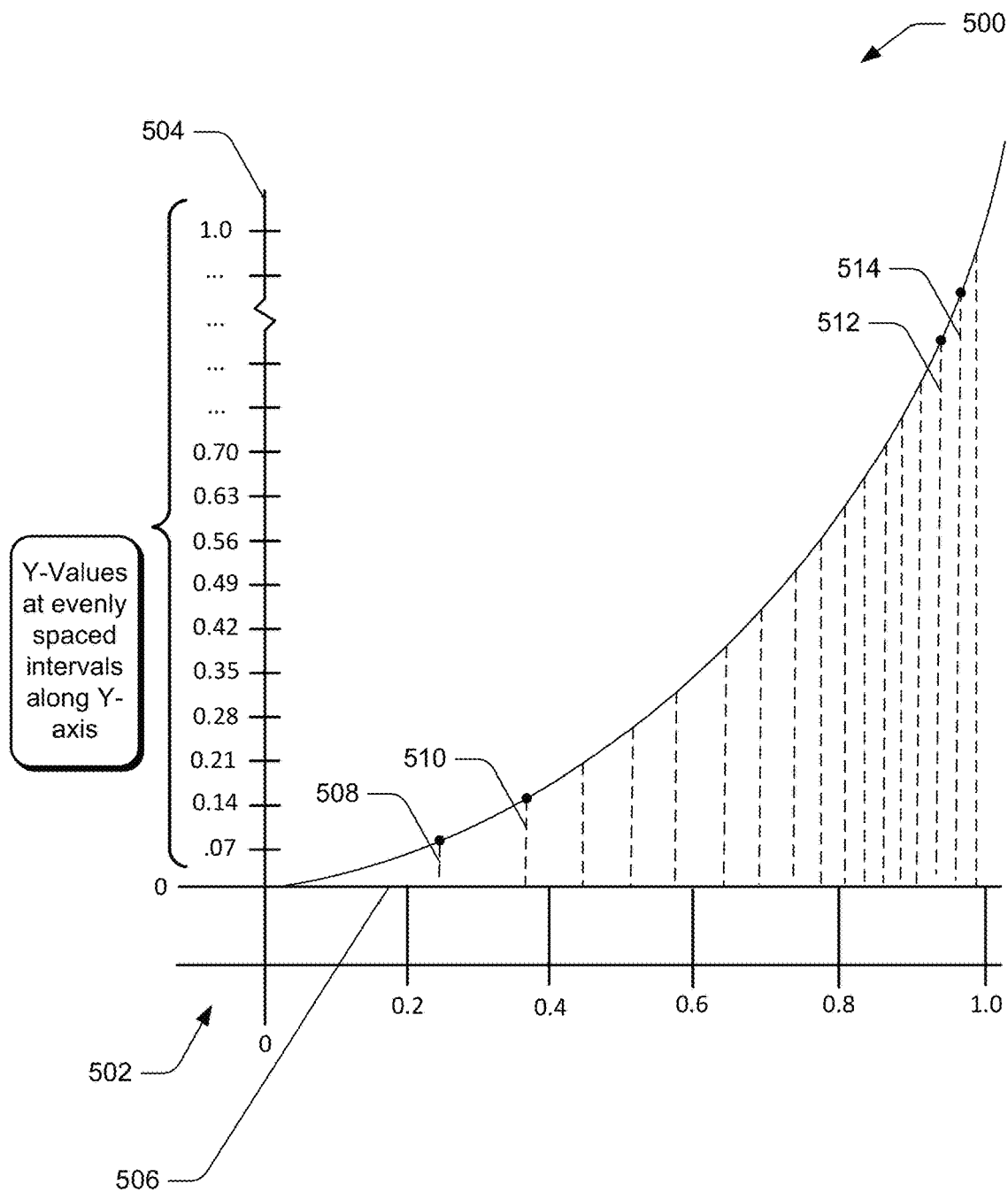
FIG. 5 depicts an example curve that defines how to transform a visual characteristic of pixels of digital visual content.

FIG. 5 depicts an example 500 of a curve that defines how to transform a visual characteristic of pixels of digital visual content.

The illustrated example 500 depicts a graph 502 of a curve, e.g., curve 402. The graph 502 includes y-values at evenly spaced intervals along the y-axis 504 of the graph 502. The graph 502 also includes value labels at evenly spaced intervals along the x-axis of the graph 502. In this example 500, the labeled y-values correspond to evenly spaced intervals of 0.07, beginning with the value of "0" on the y-axis 504 of the graph 502 and spanning to the value of "1." In other words, a range of y-values on the y-axis 504 spans from 0 to 1. The x-value labels are labeled at evenly spaced intervals of 0.2, beginning with the value of "0" on the x-axis 506 of the graph 502 and spanning to the value of "1." Thus, a range of x-values represented by the x-axis 506 also spans from 0 to 1. While the evenly spaced intervals of 0.07 and 0.2 are depicted, other intervals values are also contemplated.

Notably, graph 502 also includes dashed lines under the graphed curve. These dashed lines indicate x-correspondences on the depicted curve to the evenly-spaced y-values along the y-axis 502. Unlike the evenly-spaced y-values, the x-correspondences along the curve may not be evenly space, unless the curve is a line—when the curve is a straight line, the x-correspondences along the curve are also evenly-spaced.

In the context of a non-linear curve, consider the following discussion of four examples of these dashed lines, namely, lines 508, 510, 512, 514. Here, the line 508 and the line 510 are neighboring lines, e.g., they correspond to y-values that are one interval apart. In the illustrated example 500, for instance, the line 510 corresponds to a y-value that is 0.07 from a corresponding y-value of the line 508. The line 512 and the line 514 are also neighboring lines, e.g., they correspond to y-values that are also one interval apart. In the illustrated example 500, the line 514 corresponds to a y-value that is 0.07 from a corresponding y-value of the line 512. In the illustrated example 500, though, a difference between the x-values of the lines 510, 508 is greater than a difference between the x-values of the lines 514, 518. In other words, the x-difference between neighboring x-correspondences is not an evenly-spaced interval. Rather the x-difference depends on the evenly spaced y-values and a shape of the particular curve.

Returning to the discussion of the generators in FIG. 4, the y-axis table generator 406 represents functionality to generate y-axis table 416 from the received curve 402. By way of example, the y-axis table generator 406 generates a y-axis table 416 that has y-values corresponding to samples of the curve 402 taken at evenly spaced intervals along a y-axis of a graph of the curve 402. The evenly spaced intervals along the y-axis enable the curve sampling system 114 to generate samples having a greater frequency in portions of the curve 402 with a higher slope relative to other portions of the curve 402, e.g., portions of the curve 402 having a steeper concaving upwards shape relative the other portions of the curve.

The x-values table generator 408 represents functionality to generate an x-values table 418. By way of example, the x-values table generator 408 generates the x-values table 418 to include x-values that correspond to the y-values in the y-axis table 416. Specifically, for every y-value on the y-axis table 416, the x-values table generator 408 identifies a corresponding x-value, e.g., the x-value on the curve corresponding to the y-value of the y-axis table 416, and incorporates the identified x-value in the x-values table 418 such that it is associated with the corresponding y-value of the y-axis table 416. As such, a number of entries in the x-values table 418 is the same as a number of entries in the y-axis table 416.

The x-reference dataset generator 410 represents functionality to generate x-reference dataset 420. By way of example, the x-reference dataset generator 410 generates x-reference dataset 420 having x-reference values corresponding to samples of the curve 402 taken at evenly spaced intervals along an x-axis of the graph of the curve 402. These x-reference values are taken along the x-axis of the curve in the same range as the y-values taken along the y-axis of the graph of the curve 402. As such, the total number of x-references values in the x-reference dataset 420 match the number of y-values in the y-axis table 416.

The x-index portion generator 412 represents functionality to generate x-index portion 302. By way of example, the x-index portion generator 412 generates x-index portion 302 to include the x-index values 306 that correspond to respective x-reference values of the x-reference dataset 420. Once generated, each x-index value in the x-index portion 302, is usable to identify a corresponding x-value from the x-values table 418. In one or more implementations, each x-index value is encoded in a 12-bit representation. In general, the x-index portion generator 412 determines an x-index value by identifying a largest x-value in the x-values table 418 that is less than or equal to an x-reference value with which a particular x-index corresponds. The x-index portion generator 412 then determines an index location of the identified largest x-value from the x-values table 418. The x-index portion generator 412 sets a corresponding value of the x-index portion 302 to the determined index. The relationship between an x-reference value, an x-index value with which the x-reference value corresponds, and an x-value in the x-values table 418 that can be identified using the x-index value, will be described in greater detail in the discussion of FIG. 6.

The slope parameter portion generator 414 represents functionality to generate the slope parameter portion 304. By way of example, the slope parameter portion generator 414 generates the slope parameter portion 304 to include the slope values 308. Each slope value defines a slope value of a straight line between two consecutive x-index values in the x-index portion 302. In one or more implementations, each slope value 308 is encoded in a 4-bit representation. Each x-index value in the x-index portion 302 has a corresponding slope value in the slope parameter portion 304. The slope parameter portion generator 414 computes slope values in one example according to the following equation:

$$NN_{Slope} = \frac{(\text{smart\_index}_{i+1} - \text{smart\_index}_i) * Y_{gap}}{X[\text{smart\_index}_{i+1}] - X[\text{smart\_index}_i]} * K_{norm}$$

Here, the term $NN_{slope}$ represents a slope value of a straight line between two consecutive x-index values in the x-index portion 302, namely the two x-index values represented by the terms $\text{smart\_index}_i$ and $\text{smart\_index}_{i+1}$, respectively. The term $\text{smart\_index}_i$ represents a particular x-index value in the x-index portion 302, and the term $\text{smart\_index}_{i+1}$ represents the x-index value in the immediately following table entry of the x-index portion 302. The subscript of "i" in $\text{smart\_index}_i$ represents a position of a specific table entry in the x-index portion 302 at which a particular x-index value is located, and the subscript "i+1" in $\text{smart\_index}_{i+1}$ represents the immediately following table entry. The term $y_{gap}$ represents the value of the evenly spaced interval along the y-axis of the curve 402 at which the samples represented by the various tables are taken.

Additionally, the term $X[\text{smart\_index}_i]$ represents a location in the x-values table 418 that is identifiable using the x-index value represented by $\text{smart\_index}_i$. Specifically, $X[\text{smart\_index}_i]$ identifies the location of an x-value at the position $\text{smart\_index}_i$ in the x-values table 418—this x-value corresponds to the largest x-value in the x-values table 418 that is less than or equal to the x-reference value associated with the x-index value represented by the term $\text{smart\_index}_i$. The term $X[\text{smart\_index}_{i+1}]$ identifies the location of a different x-value located at the position $\text{smart\_index}_{i+1}$ in the x-values table 418—this different x-value represents an x-value that is the largest x-value in the x-values table 418 that is less than or equal to the x-reference value associated with the x-index value represented by the term $\text{smart\_index}_{i+1}$. Finally, the term $K_{norm}$ is a constant value (e.g., "3") that is used to normalize the above equation.

In the above-noted equation, the expression encapsulated in the numerator represents a difference between a particular x-index value and its immediately preceding x-index value in the x-index portion 302. The slope parameter portion generator 414 multiplies this difference by the $y_{gap}$ term, e.g., 1/4096 when there are 4096 entries in the y-axis table 416, the x-values table 418, the x-reference dataset 420, the x-index portion 302, and the slope parameter portion 304. Other values for $y_{gap}$ are also contemplated in the spirit or scope of the described techniques. By way of example, the interval $y_{gap}$ may depend on an application and/or hardware performing the curve sampling. For instance, where more processing resources are available, an application and the corresponding hardware may take a larger number of samples of a curve such that the interval $y_{gap}$ is smaller than in scenarios where fewer samples are taken. In other words, where fewer samples of a curve are taken the interval $y_{gap}$ is larger.

In addition, the expression in the denominator of the above-noted equation represents a difference between the two x-values represented by the terms $X[\text{smart\_index}_{i+1}]$ and $X[\text{smart\_index}_i]$, respectively. The numerator value is then divided by the denominator value and the resulting value is multiplied by the normalizing value of $K_{norm}$ (e.g., "3") to calculate a slope value. Other values for $K_{norm}$ are also contemplated in the spirit or scope of the described techniques.

In this way, the slope parameter portion generator 414 uses the above-noted equation to generate a slope value for of the x-index values 306 in x-index portion 302. The slope parameter portion generator 414 saves these slope values as the slope values 308 in the slope parameter portion 304. Broadly speaking, the $NN_{slope}$ values assist the curve sampling system 114 in approximating x-values in the x-values table 418 for areas of the curve 402 that have high slope values (e.g., slope values exceeding the value of 1).

Having generated the x-index portion 302 and the slope parameter portion 304, the lookup table generator 404 represents the functionality to generate the lookup table 118. By way of example, the lookup table generator 404 generates the lookup table 118 by including the x-index portion 302 and the slope parameter portion 304 into a single table. The lookup table 118 is then used by the curve sampling system 114 to transform the digital visual content 110 into transformed digital visual content 116 having a desired visual effect. To further explain the manner in which the lookup table 118 is used in conjunction with the y-axis table 416, the x-values tables 418, and the x-reference dataset 420 to transform digital visual content 110, consider the following discussion of FIG. 6.

Figure 6:
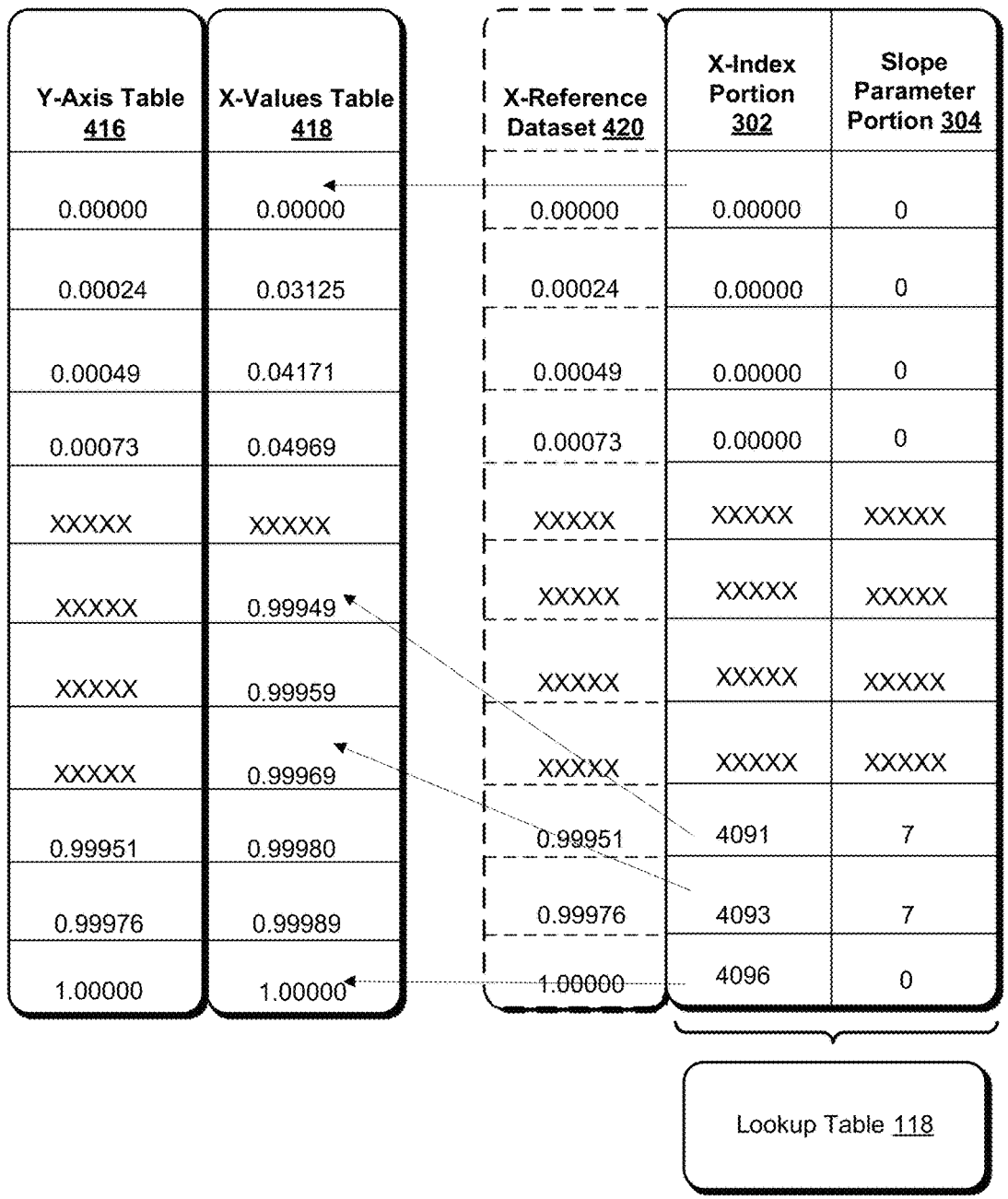
FIG. 6 depicts an example of a lookup table, an x-reference dataset, an x-values table, and a y-axis table associated with a curve.

FIG. 6 depicts an example 600 of a lookup table, an x-reference dataset, an x-values table, and a y-axis table associated with a curve.

The illustrated example 600 depicts one example of the y-axis table 416. In this example, the y-axis table 416 includes y-values for samples taken at evenly spaced intervals of 0.00024 along the y-axis of graphed curve. The y-values range from "0" to "1." Based on these y-values, the x-values table generator 408 may generate the x-values table 418. In this example, the depicted x-values table 418 includes a corresponding x-value for each of the y-values in the depicted y-axis table 416. As such, the depicted x-values table 418 has a same number of values as the y-axis table 416, e.g., a one-to-one correspondence between x-values and y-values, such that there is a corresponding x-value for each y-value in the y-axis table ranging from 0 to 1.

The illustrated example 600 also depicts an example of the x-reference dataset 420. In this example 600, the x-reference values are also taken at evenly spaced intervals of 0.00024 along the x-axis of a graphed curve. As the range and the intervals of the x-reference dataset 410 are the same as the range and intervals of the y-axis table 416 in this example 600 (e.g., from "0" to "1"), the total number of values in the example x-reference dataset 420 is the same as the total number of values in the y-axis table 416. Additionally, an example of the lookup table 118 is depicted, including the x-index portion 302 having x-index values ranging from "0" to "4096" and including the slope parameter portion 304 having slope values for each of the x-index values. Here, an x-index value from the x-index portion 302 is usable to identify a corresponding x-value from the x-values table 418, namely, an x-value that is the largest x-value in the x-values table 418 less than or equal to the x-reference value with which a particular x-index value corresponds.

In this example 600, the x-index value of 4091 is used to identify the corresponding x-value of 0.99949 (as shown by the arrow connecting 4091 to 0.99949). This x-value is the largest x-value in the x-values table 418 less than or equal to the x-reference value with which the x-index value of 4091 corresponds. In other words, the x-value of 0.99949 is the largest x-value in the x-values table 418 less than or equal to the x-reference value of 0.99951 in the x-reference dataset 420 (depicted adjacent the x-index value of 4091). In addition, the x-index values of 4093 and 4096 are used to identify corresponding x-values of 0.99969 and 1.0, respectively, and which are the largest x-values less than or equal to the x-reference values (i.e. 0.99976 and 1.0) with which the x-index values of 4093 and 4096 correspond.

Future Use of A Lookup Table To Transform Digital Visual Content

The manner in which the generated lookup table 118 can be used in the future to transform digital visual content into transformed digital visual content having a desired visual effect is described in the following discussion. In particular, the lookup table 118 can be used to generate transformed digital visual content 116 from digital visual content 110 in a manner that takes advantage of using evenly spaced curve sampling. The described evenly-spaced curve sampling enables calculation of a corresponding y-value on the curve 402 for any given x-input value that is more accurate than conventional techniques. Further, use of the lookup table 118 ensures that interpolation error—the error associated with calculating a y-value corresponding to any given x-input value—remains within an interpolation error limit. The curve sampling system 114 uses the lookup table 118 to calculate a y-value for a given x-value in the manner described below.

In one or more implementations, the curve sampling system 114 identifies a particular x-index value in the x-index portion 302 of the lookup table 118 based on an x-input value. This x-index value is calculated using the following equation:

$i_x = [X_{input} * \text{size}]$

Here, term $i_x$ represents the particular x-index value located in the x-index portion 302 of the lookup table 118. The term $X_{input}$ represents an x-input value, for which a y-value on an example of curve 402 is to be calculated. Additionally, the term "size" represents the size of the lookup table 118. In this particular equation, the curve sampling system 114 determines a particular x-index value of $i_x$ by multiplying the x-input value (represented by the term $X_{input}$) by the size of the lookup table 118, e.g., the number of entries in the lookup table 118. In the illustrated example 600, for instance, the size of the lookup table 118 is 4096. Thereafter, the calculated x-index value of $i_x$ is utilized by the curve sampling system 114 to calculate a global slope value or $g_{slope}$ in accordance with the following equation:

$$g_{slope} = \frac{NN_{slope}[i]}{k_{norm}}$$

Here, the term $NN_{slope}[i]$ represents the slope value in the slope parameter portion 304 that corresponds with the x-index value of $i_x$, calculated above. This slope enables the curve sampling system 114 identify an x-value from x-values table 418 that corresponds with the x-index value represented by $i_x$. The term $k_{norm}$ (e.g., "3") is a value used to normalize the slope values included in the slope parameter portion 304. Additionally, the term $g_{slope}$ is a global slope representing the slope of a straight line between two x-values of the curve located in the x-values table 418 that is normalized by a $k_{norm}$ value. In this particular equation, the global slope is calculated by dividing the slope value corresponding with the x-index value of $i_x$ by the slope normalizing value of $k_{norm}$.

In addition to calculating the global slope value, the curve sampling system 114 calculates a local slope in accordance with the following equation:

$$L_{slope} = \left| \frac{Y_{gap}}{X[smartindex_{i+1}] - X[smartindex_i]} \right|$$

Here, term $y_{gap}$ represents the value of the evenly spaced intervals along the y-axis of a curve. The term $smart\_index_i$ represents a particular x-index value in the x-index portion 302, and the term $smart\_index_{i+1}$ represents the x-index value in the immediately following entry in the x-index portion 302. Additionally, the term $X[smart\_index_i]$ represents a location in the x-values table 418 that is identifiable using the x-index value represented by $smart\_index_i$. Specifically, $X[smart\_index_i]$ identifies the location of an x-value at the position $smart\_index_i$ in the x-values table 418—this x-value corresponds to the largest x-value in the x-values table 418 that is less than or equal to the x-reference value associated with the x-index value represented by the term $smart\_index_i$. The term $X[smart\_index_{i+1}]$ identifies the location of a different x-value located at the position $smart\_index_{i+1}$ in the x-values table 418—this different x-value represents an x-value that is the largest x-value in the x-values table 418 that is less than or equal to the x-reference value associated with the x-index value represented by the term $smart\_index_{i+1}$. In this particular equation, the curve sampling system 114 calculates a local slope value (i.e. $L_{slope}$) by dividing the $y_{gap}$ term by the difference between the x-value represented by the term $X[smart\_index_{i+1}]$ and the x-value represented by the term $X[smart\_index_i]$.

The curve sampling system 114 uses the global slope and local slope values to determine y-delta values according to the following equations:

$$dYg_{slope} = g_{slope} * (X_{input} - X[smartindex_i])$$

$$dYL_{slope} = L_{slope} * (X_{input} - X[smartindex_i])$$

Here, as previously defined, the term $X_{input}$ represents an x-input value for which a y-value on the curve 402 is to be calculated. The term $smart\_index_i$ represents a particular x-index value in the x-index portion 302, and the term $X[smart\_index_i]$ represents the location in the x-values table 418 of the x-value indexed by $smart\_index_i$. The terms of $g_{slope}$ and $L_{slope}$, which may be computed as discussed above, in one or more implementations.

Accordingly, given the pair of just-noted equations, the curve sampling system 114 determines the y-delta for the $g_{slope}$ by multiplying the $g_{slope}$ by the difference between the received x-input value (i.e. $X_{input}$) and the x-value at the location in the x-values table 418 defined by the term $X[smart\_index_i]$. Further, the curve sampling system 114 determines the y-delta for the $L_{slope}$ by multiplying the $L_{slope}$ by the difference between the received x-input value (i.e. $X_{input}$) and the x-value at the location defined in the x-values table 418 defined by the term $X[smart\_index_i]$. Given the y-delta values for $g_{slope}$ and $L_{slope}$, the curve sampling system 114 determines a resultant delta value in accordance with the following equation:

$$dY_{approx} = dYL_{slope} + \frac{X_{input} - X[smartindex_i]}{X[smartindex_{i+1}] - X[smartindex_i]} * (dYg_{slope} - dYL_{slope})$$

Here, the terms of $dYL_{slope}$ and $dYg_{slope}$ represent y-delta values for the global slope and local slope values, which may be computed in the manner described above. In this particular equation, the curve sampling system 114 determines the resultant delta value by taking the difference between the x-input value and the x-value in the x-values table 418 represented by the term $X[smart\_index_i]$ and dividing this difference by the difference between the x-value in the x-values table represented by the term $X[smart\_index_{i+1}]$ and the x-value in the x-values table represented by the term $X[smart\_index_i]$. The resulting value is multiplied by the difference between y-delta values of the global slope and local slope, respectively, and this value is finally added with the y-delta value of the local slope. In this way, the curves sampling system 114 determines a resultant delta value, $dY_{approx}$.

The curve sampling system 114 uses the resultant delta value (i.e. $dY_{approx}$) and the value of the evenly spaced intervals along the y-axis of the graph of the curve 402 (i.e. the $Y_{gap}$ term) to calculate an X_Index Count value in accordance with the following equation:

$$X\_Index\ Count\ Value = \left| \frac{dY_{approx}}{Y_{gap}} \right|$$

The X_Index Count Value represents a number of table entries in the x-index portion 302 that need to counted from a particular table entry of an x-index value in order to identify a new x-index value in the x-index portion 302. The curve sampling system 114 determines this value by dividing the resultant delta value (i.e. $dY_{approx}$) by the evenly spaced intervals represented by the term $y_{gap}$. Using this X_Index Count Value in conjunction with the lookup table 118, the curve sampling system 114 calculates a y-value on the curve 402 for a given x-input value.

Additionally, the curve sampling system 114 ensures that the calculated y-value for the x-input value is within an interpolation error limit. Specifically, the curve sampling system ensures that the calculated y-value for the given x-input value is within the interpolation error defined by the following equation:

$$Interpolation\ Error\ Limit = \frac{[Desired\ range\ of\ f(x)]}{Table\ Size}$$

In the above defined equation, the table size represents the number of table entries in the lookup table 118, and the desired range of f(x) represents the range of values on the y-axis of the curve 402 (e.g., 0 to 1). Accordingly, the curve sampling system 114 calculates a y-value on the curve 402 given a particular x-input value such that the y-value is within the interpolation error limit as defined by the above equation.

In this way, the curve sampling system 114 uses the lookup table 118 to calculate a y-value on the curve 402 for a given x-input value, and as such, implements a curve sampling technique that enables accurate and effective generation of transformed digital visual content having a desired visual effect.

Example Procedures

This section describes example procedures for generating transformed digital visual content using the evenly-spaced curve sampling technique described herein. Aspects of the procedures may be implemented in hardware, firmware, or software, or a combination thereof. The procedures are shown as a set of blocks that specify operations performed by one or more devices and are not necessarily limited to the order shown for performing the operations by the respective blocks. At least some implementations of the procedures are performed by a suitably configured device, such as the first computing device 102 of FIG. 1 or the systems of 200 of FIG. 2 or 400 of FIG. 4 that are capable of leveraging the curve sampling system 114.

Figure 7:
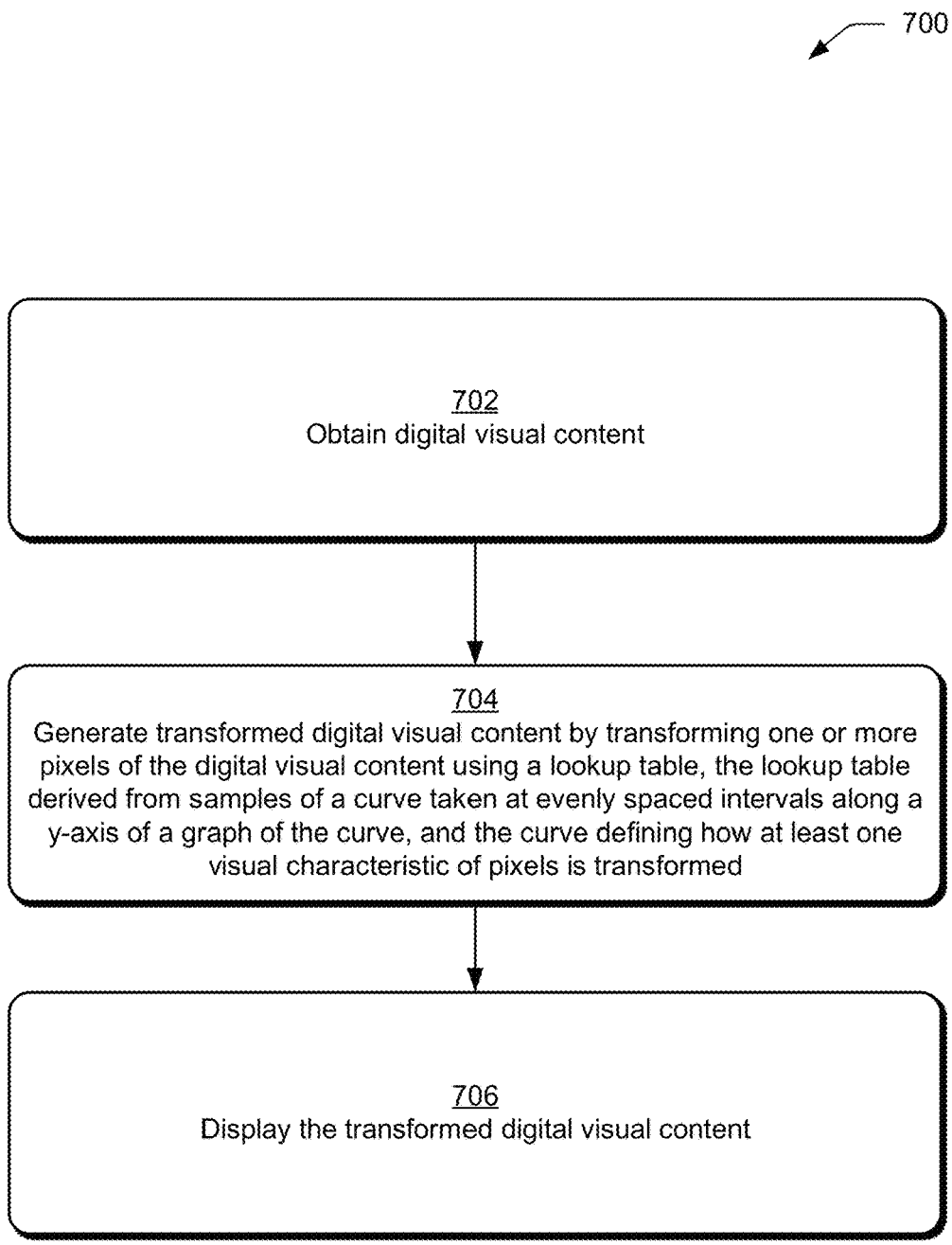
FIG. 7 depicts a procedure in an example implementation in which transformed digital visual content is generated from obtained digital visual content.

FIG. 7 depicts a procedure in an example implementation 700, in which transformed digital visual content is generated from obtained digital visual content.

Digital visual content is obtained (block 702). By way of example, the curve sampling system 114 of the first computing device 102 receives the digital visual content 110 from the second computing device 104, stores the digital visual content 110 in the storage 112 of the first computing device 102, and obtains the digital visual content 110 from storage 112 of the first computing device 102. Alternatively, the digital visual content 110 may be created by the content editing application 108 of the first computing device 102 and stored in and accessible from the storage 112 of the first computing device 102.

Transformed digital visual content is generated by transforming one or more pixels of the digital visual content using a lookup table (block 704). In accordance with the principles described herein, the lookup table is derived from samples of a curve taken at evenly spaced intervals along a y-axis of a graph of the curve. Further, the curve defines how at least one visual characteristic of pixels is transformed. By way of example, the transformation module 202 of the curve sampling system 114 uses lookup table 118 to generate the transformed digital visual content 116.

Transformed digital visual content is displayed (block 706). By way of example, the display module 204 receives the transformed digital visual content 116 and causes display of the transformed digital visual content via the display 118 of the first computing device 102.

Figure 8:
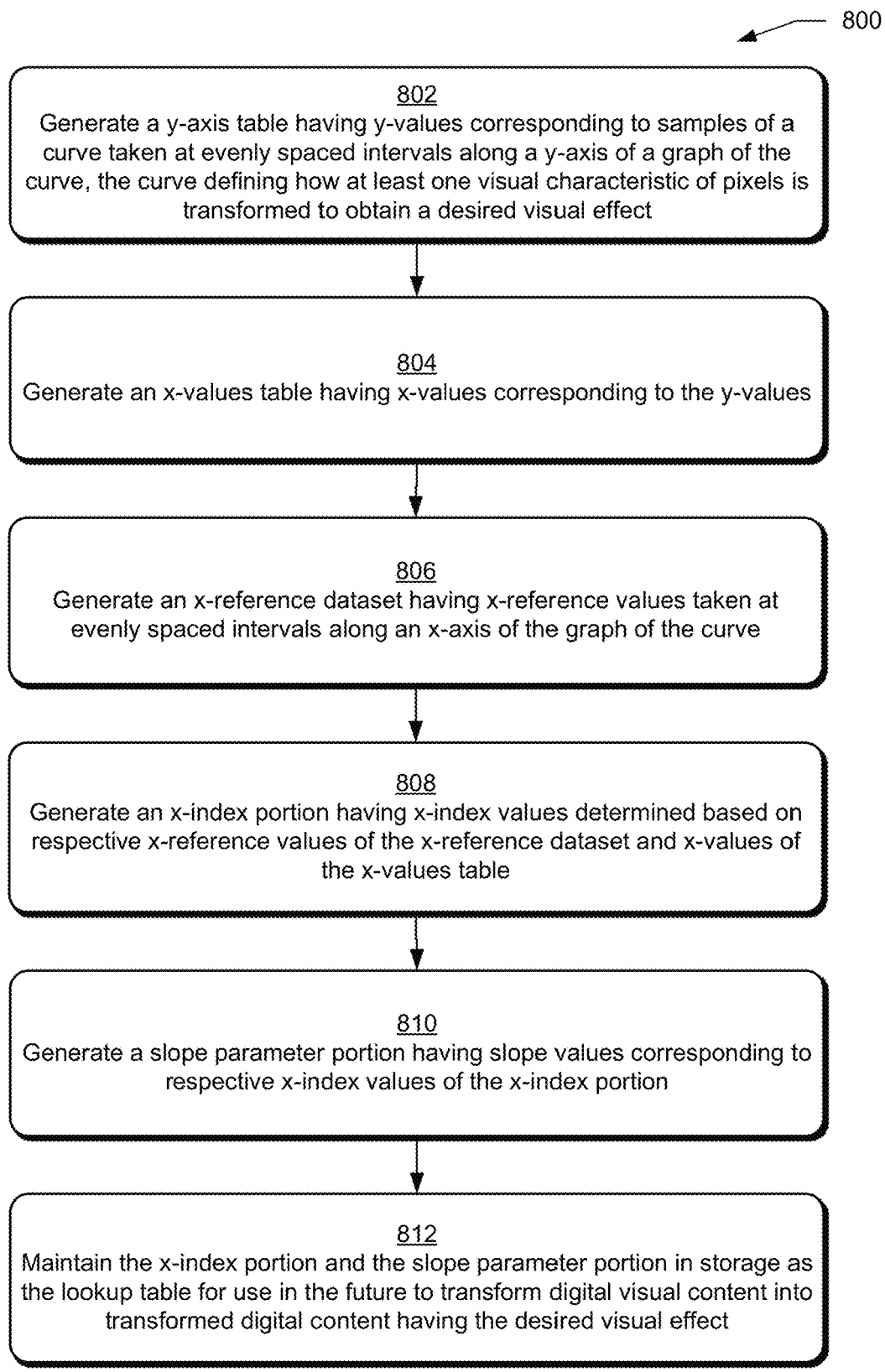
FIG. 8 depicts a procedure in an example implementation in which a lookup table is generated and maintained for use with an evenly spaced curve sampling technique.

FIG. 8 depicts a procedure in an example implementation 800, in which a lookup table is generated and maintained for use with an evenly spaced curve sampling technique.

A y-axis table is generated (block 802). In accordance with the principles discussed herein, the y-axis table includes y-values corresponding to samples of a curve taken at evenly spaced intervals along a y-axis of a graph of the curve. The curve defines how at least one visual characteristic of pixels is transformed to obtain a desired visual effect, e.g., a user desired visual effect in digital visual content. By way of example, the y-axis table generator 406 generates the y-axis table 416, which has y-values corresponding to samples of the curve 402 taken at evenly spaced intervals along a y-axis of a graph of the curve 402.

An x-values table is generated (block 804). In accordance with the principles described herein, the x-values table has x-values corresponding to the y-values. By way of example, the x-values table generator 408 generates the x-values table 418 with x-values that correspond to the y-values of the y-axis table 416.

An x-reference dataset is generated (block 806). In accordance with the principles described herein, the x-reference dataset includes x-reference values taken at evenly spaced intervals along an x-axis of the graph of the curve. By way of example, x-reference dataset generator 410 generates x-reference dataset 420 that corresponds to samples of the curve 402 taken at evenly spaced intervals along the x-axis of the graph of the curve 402.

A x-index portion is generated (block 808). In accordance with the principles described herein, the x-index portion includes x-index values that are determined based on respective x-reference values of the x-reference dataset and x values of the x-values table. By way of example, the x-index portion generator 412 generates an x-index portion 302 with x-index values 306 based on respective x-reference values of the x-reference dataset 420 and the x-values of the x-values table 418.

A slope parameter portion is generated (block 810). In accordance with the principles described herein, the slope parameter portion includes slope values corresponding to respective x-index values of the x-index portion. By way of example, the slope parameter portion generator 414 generates the slope parameter portion 304 with the slope values 308 corresponding to respective x-index values 306 of the x-index portion 302.

The x-index portion and the slope parameter portion are maintained jointly as a lookup table (block 812). In accordance with the principles described herein, the x-index portion and the slope parameter portion are maintained in storage as the lookup table for use in the future to transform digital visual content into transformed digital visual content having the desired visual effect. By way of example, the x-index portion 302 and slope parameter portion 304, with x-index values 306 and slope values 308, respectively, are incorporated to form the lookup table 118, which is stored in the storage 112. The lookup table 118 can be loaded into the GPU 120 to, in the future, transform digital visual content into transformed digital visual content with a desired visual effect, e.g., a visual effect desired by a user.

Example System and Device

Figure 9:
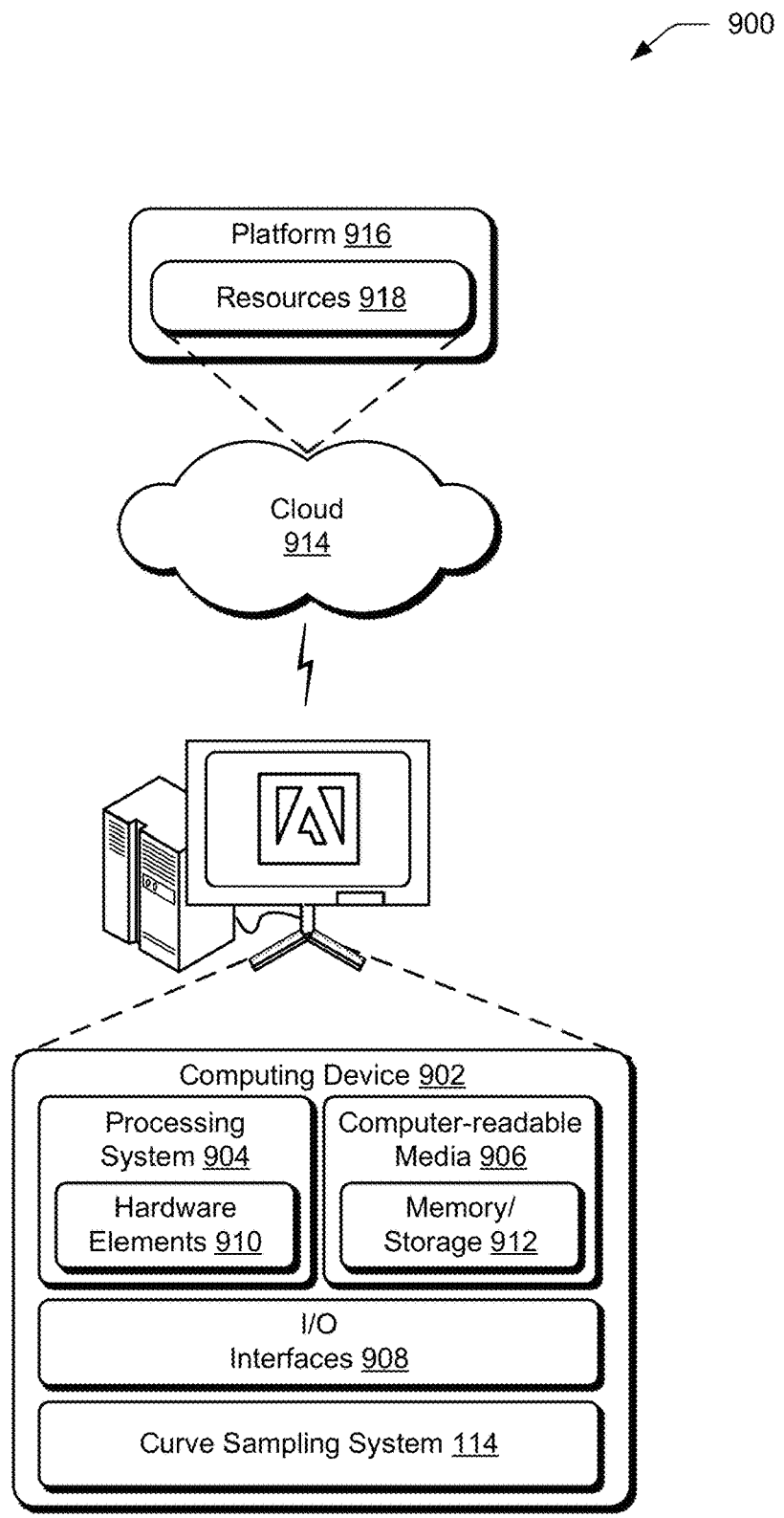
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the curve sampling system 114. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the subject matter has been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

The invention claimed is:

1. A method implemented by a computing device, the method comprising:
   obtaining digital visual content;
   obtaining a lookup table generated using a curve defining a pixel transformation applied to one or more pixels of the digital visual content to create transformed digital visual content, the lookup table generated by:
      deriving samples at evenly spaced intervals along a y-axis relative to the curve and identifying, for each of the derived samples, a value relative to the curve along an x-axis;
      designating evenly spaced sample values along the x-axis and, for each of the sample values, defining an index value for the lookup table using a largest one of the identified values relative to the curve along the x-axis not greater than the sample value; and
      generating a slope parameter portion for the lookup table that includes a plurality of slope values, each of the plurality of slope values specifying a slope between consecutive ones of the index values; and
   generating the transformed digital visual content using the lookup table.

2. The method as described in claim 1, wherein the curve defines a pixel transformation for at least one of color, tone, or luminosity of the digital content.

3. The method as described in claim 1, wherein the digital visual content is standard dynamic range digital visual content.

4. The method as described in claim 1, wherein the transformed digital visual content is high dynamic range digital visual content.

5. The method as described in claim 1, wherein each of the plurality of slope values identifies a slope of a straight line between the consecutive ones of the index values.

6. The method as described in claim 1, wherein index values are stored in 12-bit format in the lookup table and the plurality of slope values are stored in 4-bit format in the lookup table.

7. The method as described in claim 1, wherein generating the transformed digital visual content comprises loading the index values and the plurality of slope values as textures in a GPU of the computing device.

8. A system implemented by a computing device, the system comprising:
   a transformation module implemented at least partially in hardware of the computing device to generate transformed digital visual content by transforming one or more pixels of digital visual content using a lookup table, the lookup table generated by:
      identifying a curve defining how at least one visual characteristic of the one or more pixels is transformed;
      deriving samples of the curve taken at evenly spaced intervals along a y-axis relative to the curve, and identifying, for each of the derived samples, a value relative to the curve along an x-axis;
      designating evenly spaced sample values along the x-axis and, for each of the sample values, defining an index value for the lookup table using a largest one of the identified values relative to the curve along the x-axis not greater than the sample value; and
      generating a slope parameter portion for the lookup table that includes a plurality of slope values, each of the plurality of slope values specifying a slope between consecutive ones of the index values; and
   a display module implemented at least partially in hardware of the computing device to display the transformed digital visual content.

9. The system as described in claim 8, wherein the at least one visual characteristic comprises at least one of color, tone, or luminosity.

10. The system as described in claim 8, wherein the digital visual content is standard dynamic range digital visual content.

11. The system as described in claim 8, wherein the transformed digital visual content is high dynamic range digital visual content.

12. The system as described in claim 8, wherein each of the plurality of slope values corresponds to a slope of a straight line between the consecutive ones of the index values.

13. The system as described in claim 8, wherein the index values are stored in 12-bit format in the lookup table and the plurality of slope values are stored in 4-bit format in the lookup table.

14. The system as described in claim 8, wherein the transformation module is configured to generate the transformed digital visual content by loading the index values and the plurality of slope values as textures in a GPU of the computing device.

15. A method for generating a lookup table using curve sampling implemented by a computing device, the method comprising:

deriving samples at evenly spaced intervals along a y-axis relative to a curve, the curve defining how at least one visual characteristic of pixels is transformed to obtain a desired visual effect;

identifying, for each of the derived samples, a value relative to the curve along an x-axis;

designating evenly spaced sample values along the x-axis and, for each of the sample values, defining an index value for the lookup table using a largest one of the identified values relative to the curve along the x-axis not greater than the sample value;

generating a slope parameter portion for the lookup table that includes a plurality of slope values, each of the plurality of slope values specifying a slope between consecutive ones of the index values; and maintaining the index values and the slope parameter portion in storage as the lookup table, the lookup table useable to transform digital visual content into transformed digital content having the desired visual effect.

16. The method as described in claim 15, further comprising generating the transformed digital visual content by transforming one or more pixels of the digital content using the lookup table.

17. The method as described in claim 15, wherein maintaining the index values in storage as the lookup table comprises storing the index values in 12-bit format in the lookup table.

18. The method as described in claim 15, wherein maintaining the slope parameter portion in storage as the lookup table comprises storing the plurality of slope values in 4-bit format in the lookup table.

19. The method as described in claim 15, wherein the curve defines at least one of color, tone, or Lumosity for the desired visual effect.

20. The method as described in claim 15, wherein maintaining the index values and the slope parameter portion in storage as the lookup table comprises configuring the lookup table to be loaded in a single texture by a graphics processing unit.

* * * * *